Patented Jan. 19, 1954

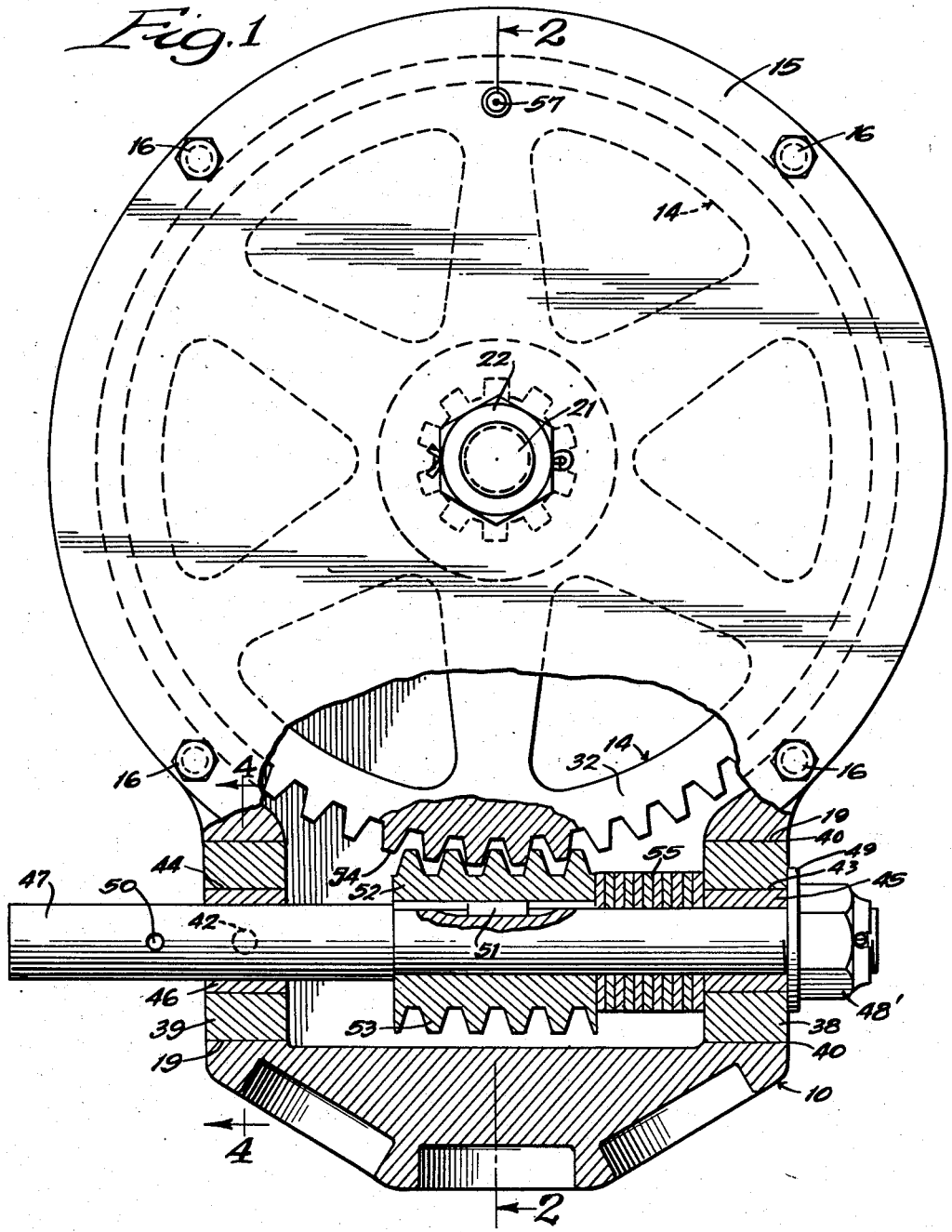

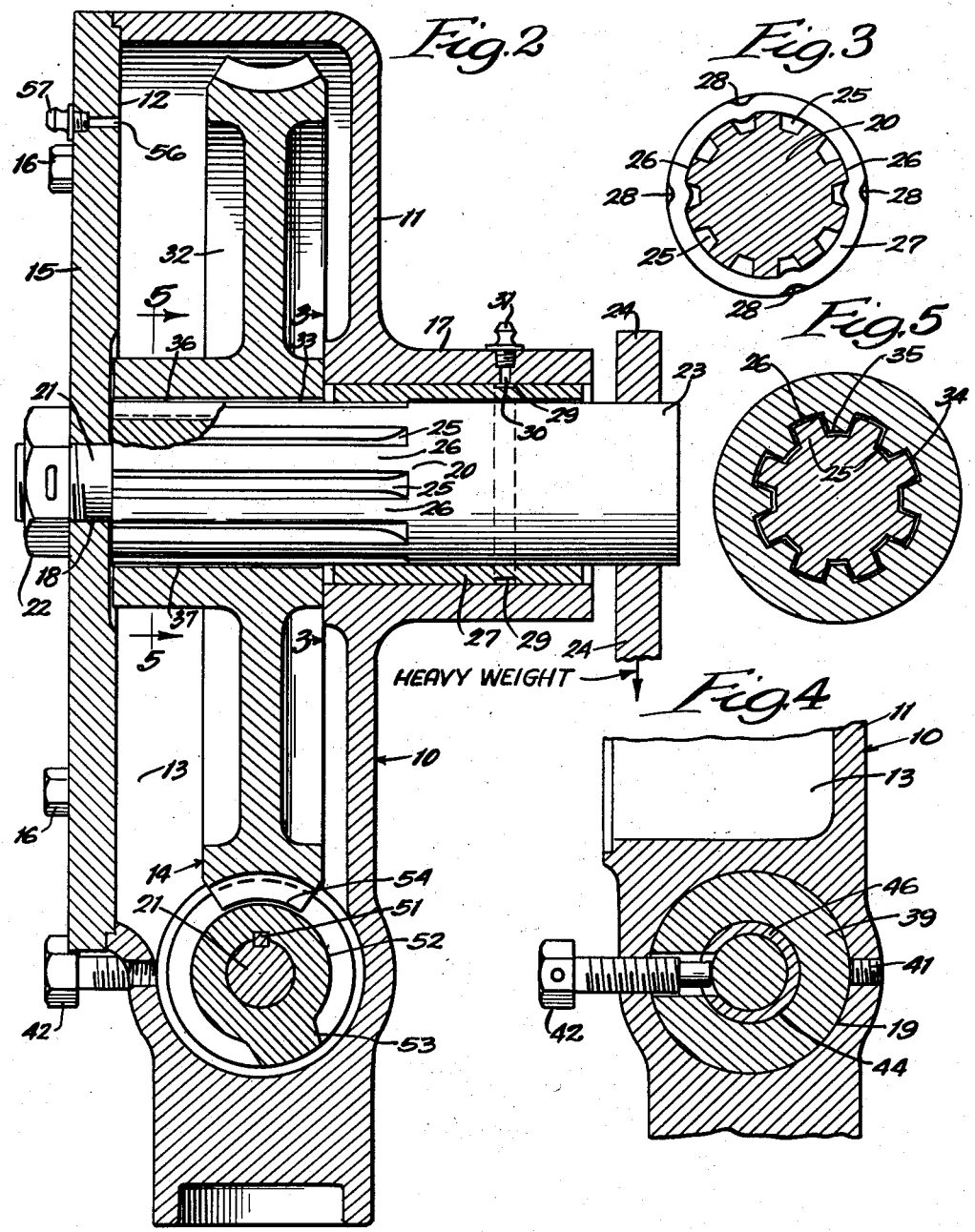

2,666,335

UNITED STATES PATENT OFFICE 2,666,335

GEAR ASSEMBLY

Norman F. Clayborne, Chicago, Ill., assignor to Clayborne Manufacturing Company, Chicago, Ill., a corporation of Illinois Application June 30, 1951, Serial No. 234,589

5 Claims. (Cl. 74—425)

My invention relates to a gear assembly, and more particularly to a gear assembly having a worm driving a worm gear. The gear assembly of my invention can advantageously be used to rotate a relatively short horizontal shaft having a heavy object suspended from a free end thereof. Such a structure is frequently employed in engine stands and the like.

Engine stands are widely employed to support diesel engines in such a way that the engines can be rotated or inverted for the purpose of making adjustments, repairs, etc. Such stands are found in a wide variety of forms. In general, however, the stands are characterized by having a bottom framework resting on the floor with upwardly extending frame members at opposite ends thereof with both of the end frames adapted for supporting a shaft from which the engine is suspended. At one end there is provided a gear assembly for rotating the shaft from which the engine is suspended to rotate the engine. It is generally desired that this shaft be manually rotatable by a crank or similar turning adaptation.

In providing gearing for the rotation of engines within engine stands, it is desired to obtain the required mechanical advantage for inverting the heavy engines by a compact gear assembly. Therefore, a gear assembly composed of a worm on the crank shaft driving a worm gear on the engine shaft is widely employed. With this type of gearing a large reduction of speed between the driving and driven shafts can be easily accomplished with a consequent proportionate increase in the torque of the driven shaft. However, the use of worm gearing has been found to be subject to certain disadvantages in that the worm gear tends to get out of proper alignment with the worm and thereby increase the friction loss unduly, and in many cases to get so far out of alignment as to jam the gears.

My investigation of the problem of undue friction loss or jamming in the worm gear assemblies on engine stands indicates that this condition arises because a very heavy object (the engine) is suspended from the free end of a short horizontal shaft, and thus at all times tends to twist this shaft upwardly out of its normal horizontal alignment and thereby turns the worm gear mounted thereon out of correct alignment with the worm.

A further problem in connection with gear assemblies of this type has arisen because of the large side thrust of the worm gear. When the standard amount of play and clearance between the teeth of the worm gear and worm is provided and the side thrust of the worm is taken by an ordinary thrust bearing, it is found that the concave teeth of the worm wear excessively, and the operation of the gears is somewhat jerky and an undesirable chattering occurs.

It is therefore an object of my invention to provide means in a worm gear assembly of the type described for preventing the worm gear from being forced out of correct alignment with the worm because of the loading on the engine shaft which necessarily creates stresses of great magnitude tending to turn the engine shaft upwardly. It is also an object of my invention to modify the standard or normal engagement between the teeth of the worm wheel and the worm and to provide improved means for accepting the side thrust of the worm which in combination will prevent the teeth of the worm gear from wearing excessively, and will cause the gear to operate smoothly and quietly. Further objects and advantages will appear as the specification proceeds.

My invention is shown in an illustrative embodiment in the accompanying drawing in which—

Figure 1 is a front elevational view of a gear box containing my improved worm gear assembly for mounting on engine stands and the like; Fig. 2, a side elevational view of the gear box and gear assembly of Fig. 1 taken in section on line 2—2 of Fig. 1; Fig. 3, a detail view of the bearing and spline shaft taken in section on line 3—3 of Fig. 2; Fig. 4, a detail view of the lock screw assembly for the worm shaft taken in section on line 4—4 of Fig. 1; and Fig. 5, a detail sectional view showing the interlocking splines and spline-ways of the driven shaft and worm gear taken in section on line 5—5 of Fig. 2.

In the illustration given, there is provided a narrow gear box 10 having a closed end 11 and an open end 12, and providing interiorly a compartment 13 adapted to receive a worm gear assembly 14. The open end 12 of gear box 10 is provided with a cover plate 15 which is detachably secured around the periphery of open end 12 by screws 16. Gear box 10 is provided centrally with a hollow tubular extension 17 aligned with a smaller opening 18 in cover plate 15, as seen more clearly in Fig. 2. The bottom of gear box 10 is provided with openings 19 aligned at right angles to the axis of opening 18 and tubular extension 17.

An engine or driven shaft 20 is mounted within tubular extension 17 having a reduced end 21 extending through cover plate opening 18 and exteriorly thereof threaded to nut 22. Shaft 20 also has a free or unsupported end 23 projecting beyond tubular extension 17 and adapted for the suspension of a heavy object therefrom so that the rotation of shaft 20 will rotate the object. For example, a bracket 24 can be secured to free end 23 by any suitable means for the suspension of an engine from free end 23. The portion of shaft 20 within compartment 13 and the innermost part of the shaft within tubular extension 17 is provided with a plurality of longitudinally extending spline-ways 25 circumferentialy spaced from shaft 20. In the illustration given, spline-ways 25 are evenly spaced and form therebetween a series of projecting longitudinal splines 26. A bearing sleeve 27 is received about the portion of shaft 20 within tubular extension 17. Bearing sleeve 27 is locked to shaft 20 by being peened into spline-ways 25 at four points 28, as seen more clearly in Fig. 3. The outside diameter of bearing sleeve 27 is such that it is snugly received within tubular extension 17 to provide the main support for shaft 20. A lubrication channel 29 is provided about the outer surface of bearing 27 in alignment with an opening 30 in tubular extension 17 having removably wedged therein a plug fitting 31.

Within compartment 13 a worm gear 32 is mounted on shaft 20 by means of central opening 33. The inner surface of gear 32 about opening 33 is provided with a plurality of longitudinal spline-ways 34, as seen more clearly in Fig. 5. In the illustration given, spline-ways 34 form therebetween a plurality of longitudinal projecting splines 35. Spline-ways 34 and splines 35 are circumferentially spaced and dimensioned to mate with spline-ways 25 and splines 26 of shaft 20 so that shaft and worm gear are interlocked.

The purpose of locking shaft 20 to worm gear 32 by the means just described is to allow shaft 20 to be turned upwardly slightly from its normal horizontal alignment without twisting worm gear 32 out of correct alignment. Therefore, it is essential to accomplish the objects of my invention that shaft 20 be loosely splined to worm gear 32. For the purposes of this application, the term "loosely splined" is to be understood to mean that the interlocking splines and splineways of shaft 20 and worm gear 32 are dimensioned so that shaft 20 can be rocked slightly upwardly or downwardly with respect to worm gear 32 while maintaining driving engagement therewith. This result is accomplished by having the interlocking splines and spline-ways of shaft 20 and gear 32 dimensioned so that the maximum diametral distance between the ends of oppositely-disposed splines on both shaft 20 and worm gear 32 is slightly less than the minimum diametral distance between the bottoms of oppositely-disposed spline-ways at all points of engagement of the splines and spline-ways. This dimensioning is shown more clearly in Fig. 5, but is also indicated in Fig. 2 by the clearance at 36 and 37.

In the bottom of gear box 10, plug members 38 and 39 are mounted within openings 19. Plug 38 which accepts the thrust of the worm gear is spot welded to gear box 10 at 40. Plug 39 is removably locked to gear box 10 by set screw 41 extending through an aperture in gear box 10 and bearing against plug 39. On its other side, as shown more clearly in Fig. 4 plug 39 is apertured to receive a lock screw 42 which is threaded into an aperture in gear box 10. Both plugs 38 and 39 are provided centrally with aligned shaft-receiving openings 43 and 44. The opening in plug 39 for receiving lock screw 42 communicates with opening 44 so that the inner end of lock screw 42 can be brought to bear against the shaft supported within opening 44. Within openings 43 and 44 there are mounted bearings 45 and 46. A driving or worm gear shaft 47 is journaled within bearings 45 and 46. The end of shaft 47 projecting beyond plug 38 is threaded to nut 48 bearing against washer 49. The other end of shaft 47 projecting outwardly beyond plug 39 can be adapted for receiving a crank, as by providing a drive pin connection at 50.

Within compartment 13 shaft 47 is connected at 51 to a worm gear 52. Worm gear 52 has helical teeth 53 thereon adapted to engage the concave teeth 54 of worm gear 32. In the illustration given and preferably, shaft 47 is mounted horizontally as is shaft 20 and extends at right angles to shaft 20. This alignment permits the highly advantageous driving engagement between the teeth of worm 52 and worm gear 32 shown more clearly in Fig. 2. However, an inspection of Fig. 2 will make it apparent that a slight turning of gear 32 from its vertical axis of engagement with worm 52 would greatly increase the friction between the gear teeth, or even cause the gear teeth to lock. The employment of the loosely splined connection between shaft 20 and worm gear 32 overcomes this difficulty by allowing gear 32 to remain in correct alignment with worm 52 even though shaft 20 is turned upwardly from its normal horizontal alignment.

Any suitable thrust bearing can be provided between worm 52 and plug 38. However, I prefer to employ a plurality of washers 55 in place of ordinary thrust bearings. Also, I prefer to provide greater than normal play and clearance between the teeth of worm 52 and worm gear 32. I have found that the combination of greater play and clearance between the gear teeth and employment of washers 55 to accept the thrust of the gear causes the gears to mesh more smoothly and decreases the chattering of the gear assembly.

It will be understood that in operation compartment 13 is packed with a suitable lubricant within which the gears revolve. For the purpose of inserting this lubricant an opening 56 is provided in cover plate 15 having therein a removable plug 57.

*Operation*

In the operation of the improved gear assembly of my invention, gear box 10 can be mounted on one of the end frames of an engine stand so that shafts 20 and 47 are horizontal. The engine or other heavy object is then suspended from shaft 20 by means of bracket 24. A crank or other turning device for manual or mechanical operation is then connected to the projecting end of shaft 47. For example, a crank can be located thereon by means of drive pin 50.

With the engine thus suspended and the crank attached, when it is desired to rotate or invert the engine for purpose of adjustment or repairs, shaft 47 is rotated by manually turning the crank so that worm 52 drives worm gear 32 and causes shaft 20 to rotate the engine in the desired direction.

During operation of the structure the gear box 10 is rigidly supported in a suitable frame that is anchored to or otherwise supported upon the floor. The frame (which is not shown) is generally a sturdy structure and the gear box 10 is carried thereon by a sturdy mounting arrangement. The frame and gear box, then, remain relatively stationary and relatively uninfluenced motionwise by the weight of an engine supported upon the shaft 23.

The weight of an engine upon the shaft 23 will, however, tend to force the gear box 10 and frame downwardly but since these members remain relatively immovable, the result is that the shaft 20 tends to pivot within the bearing 27 and both the shaft and bearing tend to pivot within the tubular extension 17 in a direction such that the free end 23 of the shaft tends to pivot downwardly and the inner end thereof upwardly—the tubular extension 17 constraining the shaft and bearing therein and serving as the fulcrum area. The reduced end portion 21 of the shaft 20 being extended through the closure plate 12, the closure plate also tends to constrain the pivoting tendency of the weighted shaft 20. Though these members are all operative to constrain the shaft 20 in a horizontal position, they do not completely overcome the influence of the weight of an engine supported at the free end of the shaft and the pivoting tendency of the shaft resulting therefrom, and particularly is this true after the shaft and constraining members have become warm.

At all times during the turning operation the weight of the engine is pulling downwardly on shaft 20 and thus creates stresses within shaft 20 which tend to turn the inner end thereof upwardly from its normal horizontal alignment. This turning tendency is limited in my structure by the positioning of the bearing means for supporting shaft 20 over substantially the entire length of the shaft between worm gear 32 and free end 23. However, it is not possible to entirely prevent the turning of shaft 20 in this way and especially when wearing of the bearing 27, extension 17, and reduced shaft portion 21 and closure plate 15 thereabout occurs, and therefore I provide means for connecting gear 32 to shaft 20 so that shaft 20 can turn upwardly slightly at its inner end without forcing gear 32 out of correct alignment with worm 52. As previously explained, this is accomplished by loosely splining shaft 20 to gear 32.

In actual tests of my gear assembly over considerable periods of time, it has been found that there is no tendency for the gears to lock or jam, and that the gears turn easily and transmit the power with relatively little friction loss. Further, it has been found that the concave teeth of worm gear 32 wear much longer than would be expected, and that the gears operate without chattering when washers 55 are employed instead of thrust bearings.

While in the foregoing specification I have set forth specific details of my invention for purpose of illustration, it will be apparent to those skilled in the art that many of these details can be varied without departing from the spirit of my invention.

I claim:

1. In a gear assembly, the combination comprising a gear box equipped with a horizontally disposed elongated bearing, a normally horizontal shaft mounted within said bearing and having a free end projecting outwardly from said bearing and adapted for the suspension of a heavy object therefrom so that the rotation of said shaft will rotate said object, a second shaft rotatably mounted in said gear box and being spaced from said first-mentioned shaft, a worm gear loosely splined to said first-mentioned shaft within said gear box and in alignment with said second shaft so that said first-mentioned shaft can be tilted slightly with respect to said worm gear, and a worm mounted on said second shaft and drivably engaging said worm gear, whereby said worm gear is permitted to remain in correct alignment with said worm even though said first-mentioned shaft is slightly pivoted upwardly at the portion thereof splined to said worm gear by the weight of said object carried on the free end of the shaft.

2. In a gear assembly, the combination comprising a gear box providing a generally horizontal elongated extension equipped with a bearing, a normally horizontal shaft mounted within said bearing and having a free end projecting outwardly from said bearing and adapted for the suspension of a heavy object therefrom so that rotation of said shaft will rotate said object, a second horizontal shaft spaced from said first-mentioned shaft and positioned at right angles thereto, a worm gear secured to said first-mentioned shaft by means of a plurality of interlocking longitudinal splines and spline-ways in said gear and on said shaft, said splines and spline-ways being formed on said first-mentioned shaft and within said worm gear so that said shaft can be rocked slightly from its normally horizontal plane and with respect to said worm gear while maintaining driving engagement therewith, and a worm mounted on said second shaft drivably engaging said worm gear.

3. In a gear assembly, the combination comprising a gear box providing a generally horizontal extension equipped with an elongated bearing, a normally horizontal shaft received within said bearing and having a free end extending outwardly therefrom and adapted for the suspension of a heavy object therefrom so that the rotation of said shaft will rotate said object, said shaft having an inner end portion equipped with a plurality of longitudinal spline-ways spaced about a portion thereof to provide splines therebetween, a worm gear having a central aperture equipped with a plurality of longitudinal spline-ways and splines therebetween mating with said first mentioned splines and spline-ways and being received on said shaft portion with said shaft splines and said worm gear splines interlocking, said interlocking members being dimensioned so that the maximum diametral distance between the ends of oppositely-disposed splines on both said shaft and said worm gear is slightly less than the minimum diametral distance between the bottoms of oppositely-disposed spline-ways at all points of engagement of said interlocking members so that said shaft can be rocked slightly with respect to said worm gear, the rocking tendency of said shaft being brought about by the weight of an object supported on said free end of the shaft, a second shaft spaced from said first-mentioned shaft, and a worm mounted on said second shaft drivably engaging said worm wheel.

4. In a gear assembly, the combination comprising a gear box providing a generally horizontal extension having an elongated bearing rotatably mounted therein, a normally horizontal shaft secured within said bearing and having a free end thereof extending outwardly from said bearing and adapted for the suspension of a heavy object therefrom so that the rotation of said shaft will rotate said object, said shaft having a plurality of longitudinal spline-ways spaced about a portion thereof within said gear box to provide splines therebetween, a worm gear having a central aperture with a plurality of longitudinal spline-ways and splines therebetween mating with said first splines and spline-ways and being received on said shaft portion with said shaft splines and said worm gear splines interlocking, said interlocking members being dimensioned so that the maximum diametral distance between the ends of oppositely-disposed splines on both said shaft and said worm gear is slightly less than the minimum diametral distance between the bottoms of oppositely-disposed spline-ways at all points of engagement of said interlocking members whereby said shaft can tilt slightly with respect to said worm gear, a second horizontal shaft spaced from said first-mentioned shaft and positioned at right angles thereto, and a worm mounted on said second shaft drivably engaging said worm gear, said worm gear and said worm having their teeth dimensioned so as to provide a relatively loose engagement between said gears.

5. In the combination of claim 4, a plurality of washers about said worm shaft extending from the inner end of said worm for accepting the thrust of said worm.

NORMAN F. CLAYBORNE.

References Cited in the file of this patent

UNITED STATES PATENTS

| Number | Name | Date |
|---|---|---|
| 870,665 | Colgren | Nov. 12, 1907 |
| 2,025,834 | Tautz | Dec. 31, 1935 |
| 2,340,707 | Staley | Feb. 1, 1944 |
| 2,427,505 | Newcomb | Sept. 16, 1947 |
| 2,467,902 | McPhee | Apr. 19, 1949 |
| 2,536,920 | Ducanis | Jan. 2, 1951 |
| 2,565,558 | Highberg | Aug. 28, 1951 |